(12) United States Patent
Kobatake

(10) Patent No.: US 7,843,812 B2
(45) Date of Patent: Nov. 30, 2010

(54) RELAY APPARATUS CAPABLE OF PREVENTING MISTAKEN LEARNING OF MAC ADDRESS LEARNING TABLE

(75) Inventor: Yoshiharu Kobatake, Tokyo (JP)

(73) Assignee: NEC Corporation, Tokyo (JP)

( * ) Notice: Subject to any disclaimer, the term of this patent is extended or adjusted under 35 U.S.C. 154(b) by 147 days.

(21) Appl. No.: 12/125,615

(22) Filed: May 22, 2008

(65) Prior Publication Data

US 2008/0298371 A1  Dec. 4, 2008

(30) Foreign Application Priority Data

May 30, 2007 (JP) ............................. 2007-142723

(51) Int. Cl.
*G01R 31/08* (2006.01)
*G06F 11/00* (2006.01)
*H04L 12/28* (2006.01)
*H04L 12/56* (2006.01)

(52) U.S. Cl. ................... 370/222; 370/392; 370/395.31

(58) Field of Classification Search ....................... None
See application file for complete search history.

(56) References Cited

U.S. PATENT DOCUMENTS

| | | | |
|---|---|---|---|
| 6,678,241 B1 | 1/2004 | Gai et al. | |
| 6,717,922 B2* | 4/2004 | Hsu et al. | 370/258 |
| 7,593,319 B1* | 9/2009 | Sivasankaran et al. | 370/216 |
| 2004/0017770 A1 | 1/2004 | Higashiyama et al. | |
| 2005/0243823 A1 | 11/2005 | Griswold et al. | |
| 2006/0120279 A1 | 6/2006 | Mitsumori | |

| | | | |
|---|---|---|---|
| 2007/0230469 A1* | 10/2007 | Teshima | 370/392 |

FOREIGN PATENT DOCUMENTS

| | | | |
|---|---|---|---|
| JP | 2001127782 A | 5/2001 | |
| JP | 2001308893 A | 11/2001 | |
| JP | 2004147172 A | 5/2004 | |
| JP | 2005027039 A | 1/2005 | |
| JP | 2005252672 A | 9/2005 | |

OTHER PUBLICATIONS

European Search Report for EP Application No. 08156990.7 completed Oct. 24, 2008.
Akio Endo, "Y17ethoam—Loopback State Options for ETH-LS", COM 13—D 1212 E, ITU-T Draft Study Period 2005-2008. International Telecommunication Union, Geneva; CH, Study Group 13, Apr. 25-May 6, 2005, pp. 1-6.
Siemens Communcation, "Surpass Carrier Ethernet", Internet Citation {Online XP002449411 Retrieved from the Internet URL:http:optical.usa.siemens.corn/carrierethernet/downloads/Siemens%20CE_%20Focus%20on%20Ehternet%20Ring%20Protection%20_20final_%2029012006.pd.>.
The Institute of Electrical and Electronics Engineers, "IEEE 802.1D IEEE Standard for Local and Metropolitan Area Networks, Media Access Control (MAC) Bridges"(Jun. 9, 2004), pp. 1-7, 41-48.

* cited by examiner

*Primary Examiner*—Chirag G Shah
*Assistant Examiner*—Ashley L Shivers

(57) ABSTRACT

A relay apparatus includes a MAC (Media Access Control) address learning table for recording transfer destinations for frames. The relay apparatus is connected to other relay apparatuses to compose a network of a ring redundancy method. The relay apparatus includes a port move detecting circuit for detecting a port move which occurs in a case where a frame arrives from other than a path learned in the MAC address learning table on a path changing on ring redundancy.

9 Claims, 10 Drawing Sheets

__NUM__US 7,843,812 B2__NUM__

RELAY APPARATUS CAPABLE OF PREVENTING MISTAKEN LEARNING OF MAC ADDRESS LEARNING TABLE

This application is based upon and claims the benefit of priority from Japanese patent application No. 2007-142723, filed on May 30, 2007, the disclosure of which is incorporated herein in its entirety by reference.

BACKGROUND OF THE INVENTION

This invention relates to a relay apparatus, a network, and a frame relay method and, in particular, to technologies for working around a loop on the network and for ensuring redundancy in a case where a plurality of relay apparatuses are connected in a loop fashion to compose the network.

In a case where a plurality of relay apparatuses are connected to a network, there are ring redundancy methods as technologies for working around a loop on the network and for ensuring redundancy. One of the ring redundancy methods is disclosed in an informal paper under the title of "Extreme Network' Ethernet (registered trademark) Automatic Protection Switching (EAPS) Version 1", RFC (Request For Comments) 3619 (October 2003).

However, in a case of carrying out a path switching in the ring redundancy method, there is a possibility that reversal of arrival order of a frame occurs and it results in having a large effect on frame transfer of a higher layer. In addition, when the reversal of the arrival order of the frame occurs, an improper learning occurs in a MAC (Media Access Control) address table and there is a possibility that communication cannot be carried out after occurrence of the reversal of the arrival order.

In a case where a plurality of relay apparatuses are connected in a ring-shaped fashion by using a ring redundancy method, a control protocol is required to release a loop of a frame relay path. However, a current control protocol may occur reversal of arrival order of a frame in a transient state on a path switching and may have a deleterious effect on frame transfer of an upper layer. In addition, when the reversal of the arrival order occurs, a mistaken learning of the MAC address table occurs. It is therefore a possibility that it is impossible to carry out communication on or after occurrence of the reversal of the arrival order.

When a failure occurs in a link of a part in ring structure of the Ethernet (registered trademark), a phenomenon in which arrival order of the frames reverses occurs. By the reversal of the arrival order, it gives rise to problems as follows:

(1) it has adverse effect on the upper layer because the order of data reverses; and (2) when a frame arrives through an old route after a frame arrives through a new route and a route learning is carried out, the old route is mistakenly learned in the address learning table and there is a possibility that it compromises communications after this.

Various arts related to this invention are already proposed. By way of illustration, Japanese Unexamined Patent Application Publication of Tokkai No. 2001-127,782 or JP-A 2001-127782 (which will be also called a first patent document), which corresponds to U.S. Pat. No. 6,952,396 discloses a control system which enables transport of payload data across a dual counter rotating ring (DCRR) network having two or more nodes. Each node provides access to the DCRR network by a respective local area network (LAN) subtending the node. The control system comprises a topology learning entity operative within each node for monitoring individual, links of the DCRR, discovering the active topology of the DCCR, communicating topology changes to other nodes in the DCCR, and informing frame forwarding and learning processes of the topology to enable failover to redundant resource upon detection of a network component failure. A frame forwarding process selects a shortest path route between a source and a destination node in the DCCR, and forwards frames to the destination node via the selected shortest path route. An address learning process inspects a source medium access control (MAC) address in each received frame to learn a shortest path route for each MAC address.

In addition, Japanese Unexamined Patent Application Publication of Tokkai No. 2001-308893 or JP-A 2001-308893 (which will later be called a second patent document) discloses a routing information dynamic reconfiguration system in a loop topology network that automatically performs routing of a substitute path, on the occurrence of a fault in a communication cable and a node. The loop topology network disclosed in JP-A 2001-308893 comprises first through fourth nodes which are connected in form of a loop. The first and the fourth nodes comprise first and fourth network interface cards (NICs) which detect a fault of a third communication cable between the first and the fourth nodes, and inform first and fourth control software items of the first and the fourth nodes about the result of detection. The first and the fourth control software items inform the second and the third nodes about fault information. The second and the third nodes eliminate all routing information via the third communication cable, transmit an alive notice packet denoting the normality of the own nodes to the first and the fourth nodes. When the first and the fourth nodes are marked as being a communication disabled state in the information of the packet, the first and the fourth nodes add the information of their own nodes to the information of the packet, transmit the resulting information to an opposite node to reconfigure the routing information to a target node.

Japanese Unexamined Patent Application Publication of Tokkai No. 2004-147172 or JP-A 2004-147172 (which will later be called a third patent document), which corresponds to U.S. Patent Application Publication No. 2004/0081082, discloses a ring switchover method which enables a fast ring switchover in a packet processing at the time of ring configuration. In the third patent document, a system switchover function can be implemented in an Ethernet switch or the like by the ring switchover method in a network constituted by layer 2 switches connected to a ring shape. Each layer 2 switch has a path control function and a failure detection function. The ring switchover method includes the steps of providing in each layer 2 switch and address learning table in which a Media Access Control (MAC) address and a corresponding port are stored; on detecting of a link failure between mutually neighboring layer 2 switches, transmitting a failure notification frame packet from each neighboring layer 2 switch; and in the layer 2 switch having received the failure notification frame, recording a Media Access Control (MAC) address of said layer 2 switch into the failure notification frame, and transferring the failure notification frame to a neighboring layer 2 switch.

Japanese Unexamined Patent Application Publication of Tokkai No. 2005-27,039 or JP-A 2005-27039 (which will later be called a fourth patent document) discloses a duplex ring network performing uninterruptible transmission which is equivalent to a line switching technology without affecting the transmission efficiency of a packet. The duplex ring network disclosed in the fourth patent document comprises first through seventh nodes which are connected in a ring-shaped fashion. When the first node transmits a unicast data packet to the second through the seventh nodes, the first node selects a ring with the shortest path. It will be assumed that the first node acts as a transmission source node while the sixth node acts as a destination node. When the failure occurs in the selected ring with the shortest path, the first node (the transmission source node) selects a ring that does not pass through a failure place. In this case, the transmission source node stores a unicast data packet for all nodes at a normal time ahead of the failure occurrence and transmits the stored unicast data packet the ring that does not pass through the failure place when the destination node (the sixth node) is not on the ring with the shortest path when the transmission source node selects the ring that does not pass through the failure place. Thus, the unicast data packet for the destination node can be transmitted through the second through the fifth nodes with no short break.

Japanese Unexamined Patent Application Publication of Tokkai No. 2005-252,672 or JP-A 2005-252672 (which will later be called a fifth patent document) discloses a switching hub. In this switching hub, no flooding occurs immediately, when switching a communication path by generating a barrier. JP-A 2005-252672 discloses a ring-shaped network comprising first through eighth switching hubs which are connected to a transmission path in a ring-shaped fashion. The first switching hub having a function for logically disconnecting a loop by logically blocking a clockwise side port thereof. It will be assumed that a failure occurs in the transmission path between the fourth and the fifth switching hub. In this event, the fourth switching hub re-registers fifth through eighth address learning information pieces into a clockwise side port of the opposite side. The fifth through the eighth address learning information pieces are transmitted from the clockwise side port of the fourth switching hub. When the third switching port receives the fifth through the eighth address learning information pieces, the fifth through the eighth address learning information pieces are re-registered to a clockwise side port of the opposite side.

However, any of the first through the fifth patent documents neither discloses nor teaches reversal of arrival order of a frame and mistaken learning of a MAC address learning table.

SUMMARY OF THE INVENTION

It is an exemplary object of this invention to provide a relay apparatus, a network, and a frame relay method which are capable of preventing reversal of arrival order of a frame.

It is another exemplary object of this invention to provide a relay apparatus, a network, and a frame relay method which are capable of preventing mistaken learning of a MAC address learning table.

Other exemplary objects of this invention will become clear as the description proceeds.

According to a first exemplary aspect of this invention, a relay apparatus includes a MAC (Media Access Control) address learning table for recording transfer destinations for frames. The relay apparatus is connected to other relay apparatuses to compose a network of a ring redundancy method. The relay apparatus includes a port move detecting circuit for detecting a port move which occurs in a case where a frame arrives from other than a path learned in the MAC address learning table on a path changing on ring redundancy.

According to a second exemplary aspect of this invention, a network of a ring redundancy method includes a plurality of relay apparatuses which are connected to each other in a ring fashion. Each relay apparatus includes a MAC (Media Access Control) address learning table for recording transfer destinations for frames. Each of the relay apparatuses includes a port move detecting circuit for detecting a port move which occurs in a case where a frame arrives from other than a path learned in the MAC address learning table on a path changing on ring redundancy.

According to a third exemplary aspect of this invention, a frame relay method is for use in a relay apparatus including a MAC (Media Access Control) address learning table for recording transfer destinations for frames. The relay apparatus is connected to other relay apparatuses to compose a network of a ring redundancy method. The frame relay method includes, in the relay apparatus, detecting a port move which occurs in a case where a frame arrives from other than a path learned in the MAC address learning table on a path changing on ring redundancy.

DESCRIPTION OF THE EXEMPLARY EMBODIMENT

Figure 1:
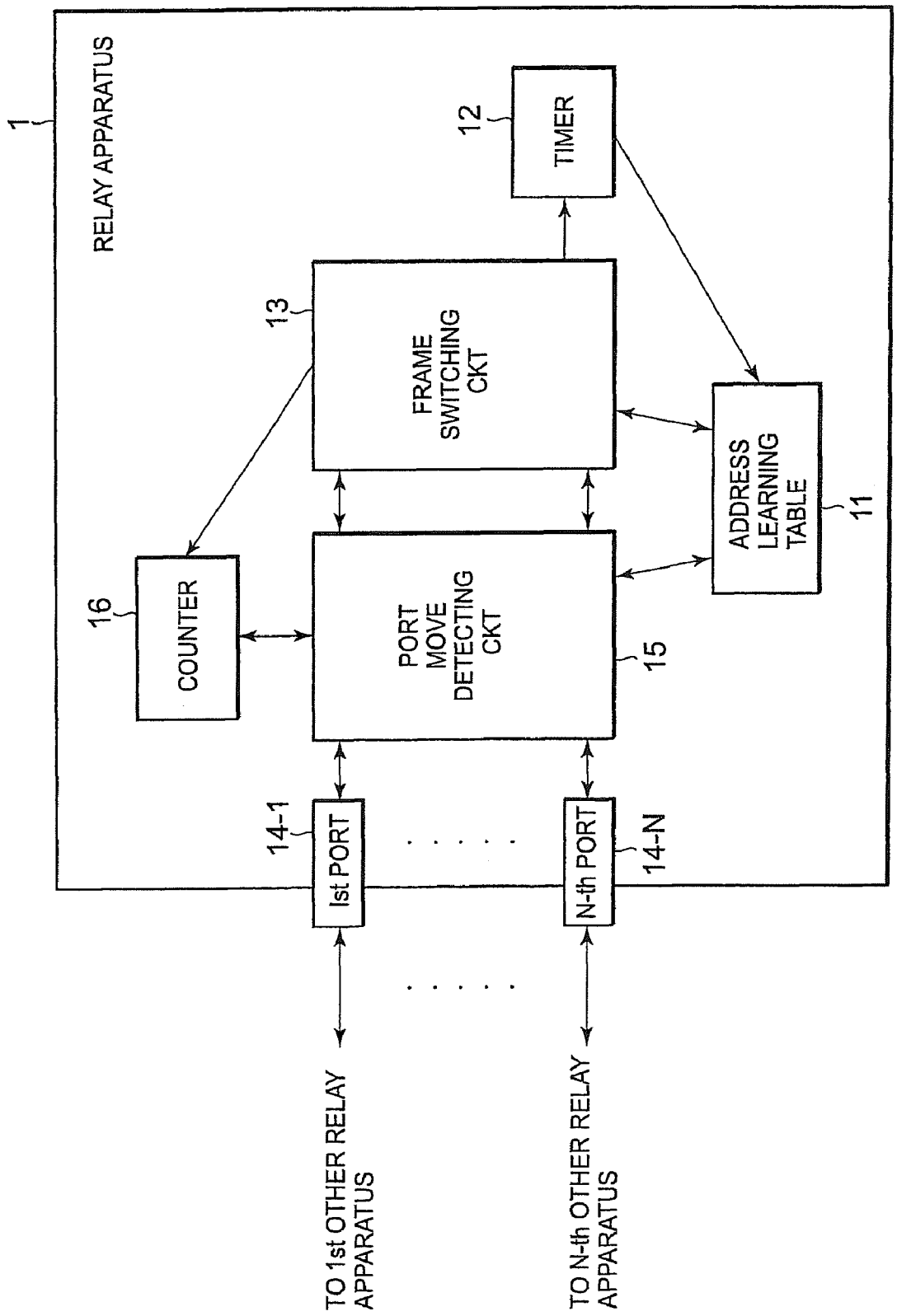
FIG. 1 is a block diagram showing a configuration example of a relay apparatus according to an exemplary embodiment of this invention.

FIG. 1 is a block diagram showing structure of a relay apparatus 1 according to an exemplary embodiment of this invention. In FIG. 1, the relay apparatus 1 comprises a MAC (Media Access Control) address learning table 11, a timer 12, a frame switching circuit 13, first through N-th ports 14-1 to 14-N, a port move detecting circuit 15, and a counter 16, where N represents a positive integer which is not less than two.

The MAC address learning table 11 is connected to the frame switching circuit 13 and records or stores destination MAC addresses for frames and port names indicative of ports for transferring the frames. When the MAC address learning table 11 is supplied from the timer 12 with a notice of MAC address learning table cancellation, the MAC address learning table 11 cancels all of contents recorded therein.

The timer 12 starts timing or clocking by the frame switching circuit 13 at a timing start time instant. When a predetermined time interval elapses from the timing start time instant, the timer 12 notifies the MAC address learning table 11 of the MAC address learning table cancellation.

When a frame is transferred to the frame switching circuit 13 through the port move detecting circuit 15, the frame switching circuit 13 refers the MAC address learning table 11 to carry out processing of the frame. When a MAC address learning table cancellation frame is transferred from the port move detecting circuit 15 to the frame switching circuit 13, the port move detecting circuit 15 makes the timer 12 start the timing or the clocking thereof.

The port move detecting circuit 14 is connected to the first through the N-th ports 14-1 to 14-N. Regardless of whether the frame transferred from the first port 14-1 has the same transmission source MAC address, the port move detection circuit 14 detects a port move transferred from the N-th port 14-N which is another port.

When the port move detecting circuit 14 receives frames from the first through the N-th ports 14-1 to 14-N, the port mover detecting circuit 14 refers the MAC address learning table 11 to detect the presence or absence in the occurrence of the port move. When the port move detecting circuit 14 detects the port move, the port move detecting circuit 14 notifies the counter 16 that the port move occurs. The port move detecting circuit 14 transfers, to the frame switching circuit 13, the frames transferred from the first through the N-th ports 14-1 to 14-N.

Every time the port move detecting circuit 15 notifies the counter 16 that the port move occurs, the counter 16 is incremented. The counter 16 is thus notified every time a port move occurs, and corresponds to the number of times such port moves occur.

The frame switching circuit 13 refers to the counter 16 and does not carry out transfer of the frame if the port move occurrence count of the transmission source MAC address of the frame is equal to two or more.

The first through the N-th ports 14-1 to 14-N are connected to first through N-th other relay apparatuses #1 to #N and send communication contents to the port move detecting circuit 15 as it is.

Figure 2:
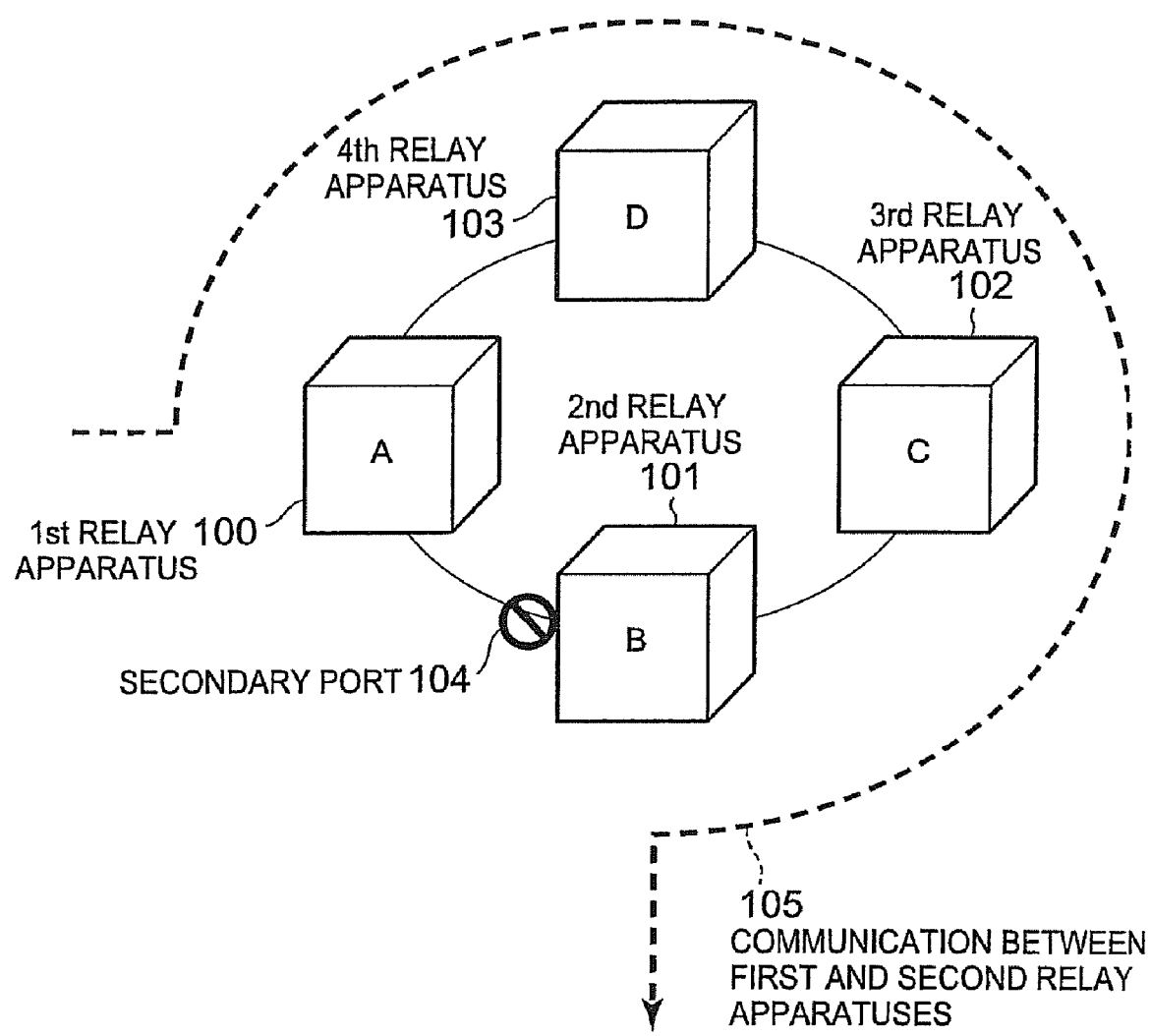
FIG. 2 is a view for use in describing operation of a network according to an exemplary embodiment of this invention.
Figure 3:
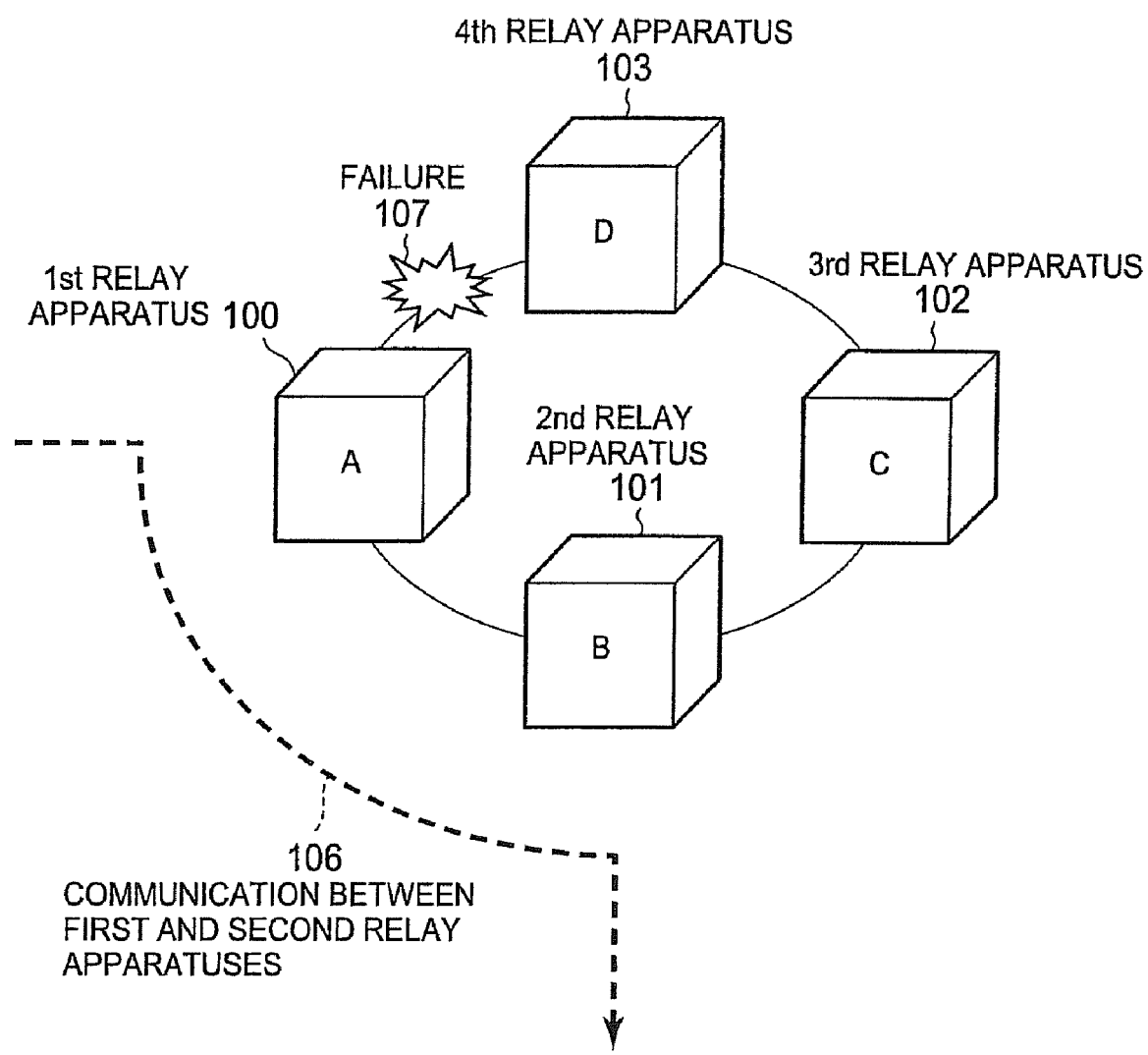
FIG. 3 is a view for use in describing operation of a network according to the exemplary embodiment of this invention.

FIGS. 2 and 3 are views for use in describing operation of a network according to an exemplary embodiment of this invention.

Referring now FIG. 2, the description will be made as regards operation in a case where any failure does not occurs in a ring connection of the relay apparatuses related to this invention.

The illustrated network is a network where first through fourth relay apparatuses 100, 101, 102, and 103 are connected to each other in a ring fashion in a counterclockwise direction. In the example being illustrated, the first through the fourth relay apparatuses 100 to 103 are referred to as a relay apparatus A, a relay apparatus B, a relay apparatus C, and a relay apparatus D, respectively. In FIG. 2, the first through the fourth relay apparatuses 100 to 103 are depicted at A, B, C, and D, respectively.

Inasmuch as the first through the fourth apparatuses 100 to 103 are connected to each other in the ring fashion as it is, the frame is transmitted in a loop fashion when the frame is transmitted. As a result, a phenomenon in which a communication path or route is saturated with unnecessary frames occurs.

Therefore, a part of the communication path or route, that is a secondary port 104 of the second relay apparatus 101, is systematically broken or interrupted to release a loop state of the network. In the example being illustrated in FIG. 2, a breaking or an interrupting is made between the first relay apparatus 100 and the second relay apparatus 101. Under the circumstances, it will be assumed that the first relay apparatus 100 transfers, to the second relay apparatus 101, a frame (communication 105 between the first relay apparatus 100 and the second relay apparatus 101) in a clockwise direction. In this event, the frame advances the path or the route of the first relay apparatus 100, the fourth relay apparatus 103, the third relay apparatus 102, and the first relay apparatus 101 in the clockwise direction to arrive at a destination MAC address.

Referring to FIG. 3, this figure shows the operation in the case where a failure 107 occurs between the first relay apparatus 100 and the fourth relay apparatus 103 in the network of FIG. 2.

It will be presumed that communication between first relay apparatus 100 and the second relay apparatus 101 occurs. Under the circumstances, when the failure 107 occurs in the communication path or route in FIG. 2, it is impossible to carry out the communication between the first relay apparatus 100 and the second relay apparatus 101. Therefore, by opening the secondary port 104 of the second relay apparatus 101 where the communication is broken or interrupted, it is possible to carry out communication 106 between the first relay apparatus 100 and the second relay apparatus 101 in a counterclockwise direction.

Figure 10:
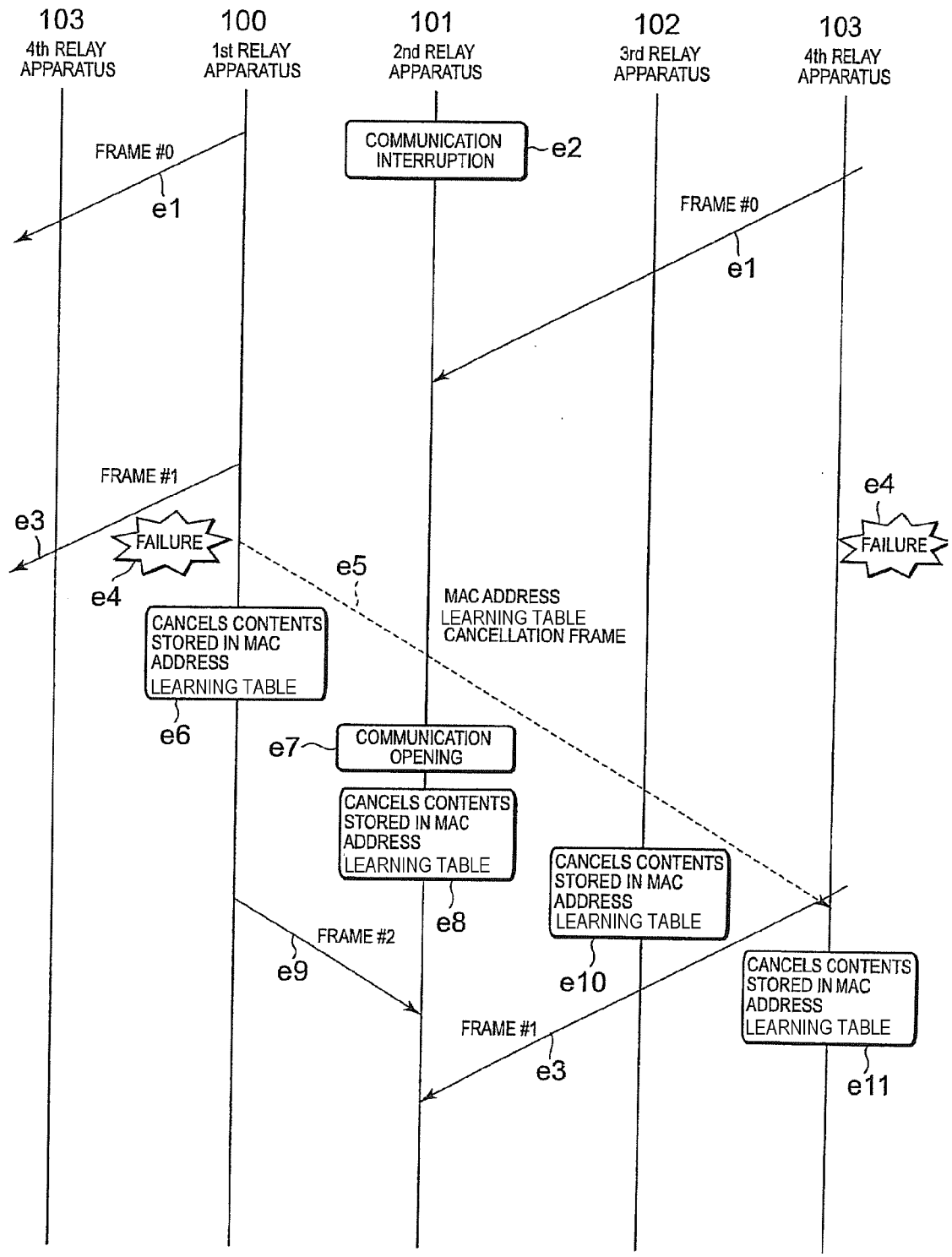
FIG. 10 is a sequence chart for use in describing an operation of an network according to a related art.

Referring to FIG. 10, the description will proceed to an example where a mistaken learning occurs in a case where the failure 107 occurs. FIG. 10 is a sequence chart for use in describing an operation of a network of a related art.

A zeroth frame #0 is transferred from the first relay apparatus 100 toward the second relay apparatus 101 in the clockwise direction (at a first event e1 in FIG. 10). Therefore, the MAC address learning table 11 in each relay apparatus is renewed and a path or a route passing through the first relay apparatus 100, the fourth relay apparatus 103, the third relay apparatus 102, and the second relay apparatus 101 in the clockwise direction is recoded in the MAC address learning table 11. In addition, a path or a route between the first relay apparatus 100 and the second relay apparatus 101 is broken or interrupted by the secondary port 104 of the second relay apparatus 101 in order to release the loop state of the network (at a second event e2 in FIG. 10).

A first frame #1 is transferred from the first relay apparatus 100 toward the second relay apparatus 101 in the clockwise direction (at a third event e3 in FIG. 10).

At a time instant when the first frame #1 is transferred to the fourth relay apparatus 103, the failure 107 occurs between the first relay apparatus 100 and the fourth relay apparatus 103 (at a fourth event e4 in FIG. 10).

Ports bordering a zone where the above-mentioned failure 107 (at the fourth event e4 in FIG. 10) occurs are broken or interrupted.

Communication between the first relay apparatus 100 and the second relay apparatus 101 that is broken or interrupted (at the second event e2 in FIG. 10) by the secondary port 104 is opened (at a seventh event e7 in FIG. 10).

Inasmuch as the failure 107 occurs (at the fourth event e4 in FIG. 10), a MAC address learning table cancellation frame is transmitted from the first relay apparatus 100 in the counterclockwise direction (at a fifth event e5 in FIG. 10).

Each of the first through the fourth relay apparatuses 100 to 103 cancels contents stored in the MAC address learning table 11 (at sixth, eighth, tenth, and eleventh events e6, e8, e1 0, and e11 in FIG. 10) upon receipt of the MAC address learning table cancellation frame (at the fifth event e5 in FIG. 10).

The first relay apparatus 100 transmits a second frame #2 toward the second relay apparatus 101 in the counterclockwise direction (at a ninth event e9 in FIG. 10). The second frame #2 is directly transmitted from the first relay apparatus 100 to the second relay apparatus 101. This is because the contents stored in the MAC address learning table 11 are cancelled and a flooding occurs caused by absence of the path or the route.

When the second frame #2 arrives in the second relay apparatus 101 (at the ninth event e9 in FIG. 10), the MAC address learning table 11 in the second relay apparatus 101 is renewed by using information in the second frame #2 by the frame switching circuit 13 (at the ninth event e9 in FIG. 10).

Thereafter, the first frame #1 arrives in the second relay apparatus 101 from the fourth relay apparatus 103 in the clockwise direction and the MAC address learning table 11 in the second relay apparatus 10 is renewed by using information in the first frame #1 (at the third event e3 in FIG. 10) which is old mistaken information.

Inasmuch as the MAC address learning table 11 in the second relay apparatus 101 makes a mistake, it is impossible to carry out communication in a case where the communication is carried out through the second relay apparatus 101.

In a case where the first through the fourth relay apparatuses 100 to 103 are connected in the ring-shaped fashion by using the ring redundancy method, a control protocol is required to release the loop of a frame relay path or route. However, a current or a conventional control protocol may result in a reversal of arrival order of a frame in a transient state on a path or when route switching, which may have a deleterious effect on frame transfer in an upper layer. In addition, when the reversal of the arrival order occurs, a mistaken learning of the MAC address learning table 11 occurs. It is therefore a possibility that it is impossible to carry out communication on or after occurrence of the reversal of the arrival order, as mentioned in the preamble of the instant specification.

When the failure 107 occurs in a link of a part in ring structure of the Ethernet (registered trademark), a phenomenon in which arrival order of the frames reverses occurs. By the reversal of the arrival order, it gives rise to problems as follows:

(1) it has adverse effect on the upper layer because the order of data reverses; and (2) when a frame arrives through an old path or route after a frame arrives through a new path or route and a path or route learning is carried out, the old path or route is mistakenly learned in the MAC address learning table 11 and there is a possibility that it compromises communications after this.

Figure 4:
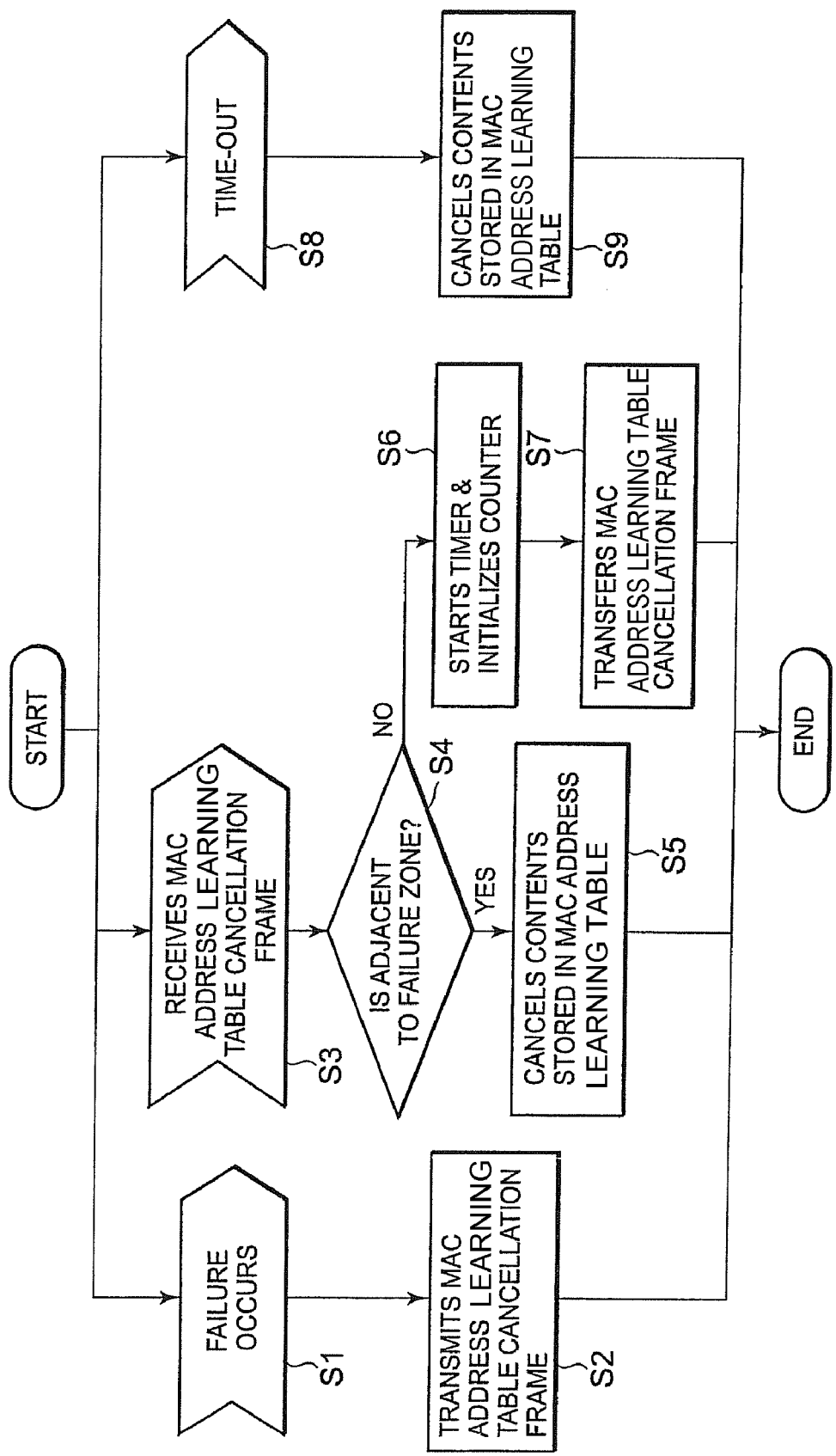
FIG. 4 is a flow chart for use in describing operation of the relay apparatus according to the exemplary embodiment of this invention.
Figure 5:
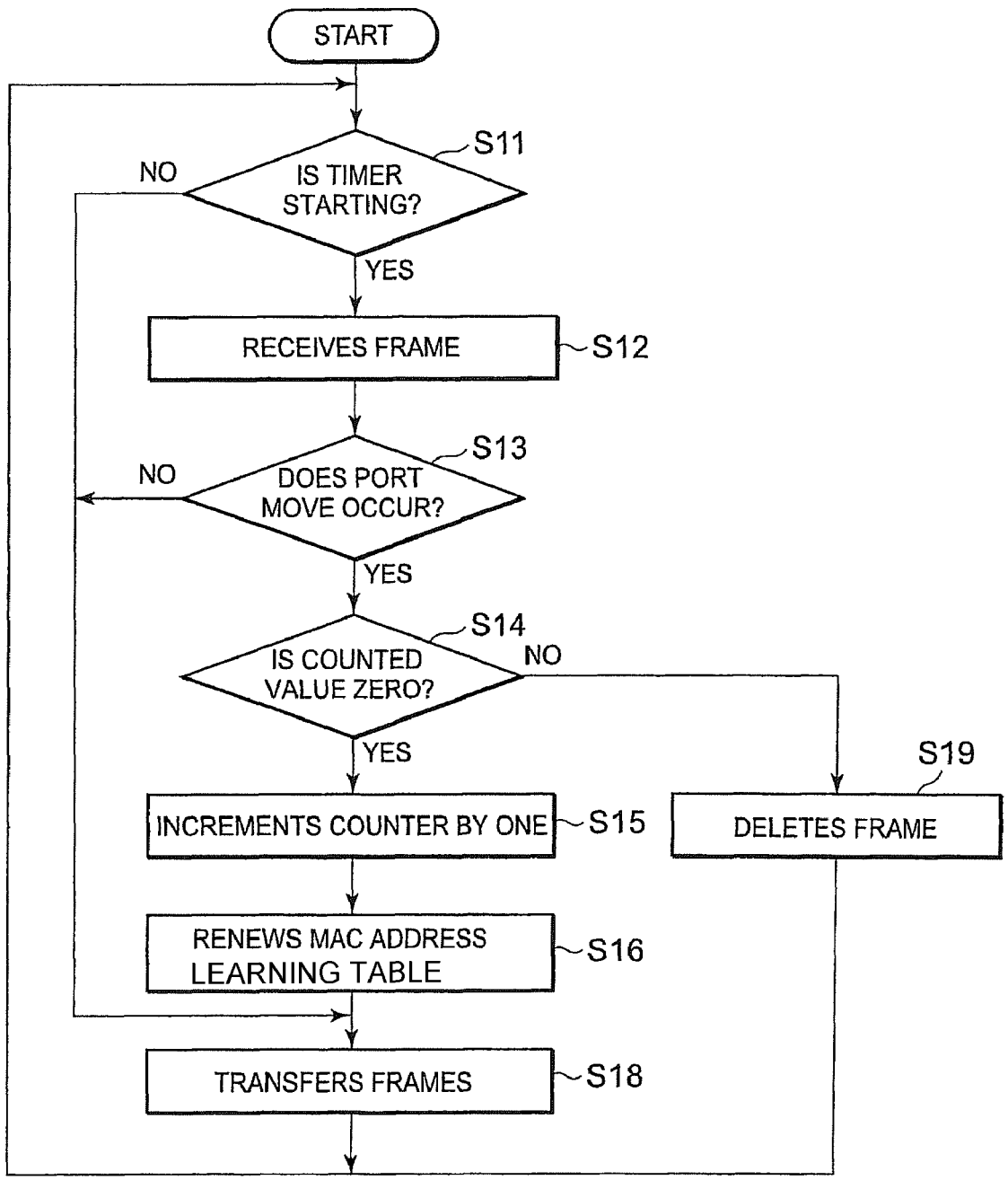
FIG. 5 is a flow chart for use in describing operation of the relay apparatus according to the exemplary embodiment of this invention.

FIGS. 4 and 5 show flowcharts for use in describing operation of the relay apparatus 1 according to the exemplary embodiment of this invention.

Referring to FIGS. 1 to 5, these figures show operation in the case where the failure 107 occurs between the first relay apparatus 100 and the fourth relay apparatus 103 in the network.

It will be assumed that the failure 107 occurs in the network (at a step Si in FIG. 4). In this event, a master switch, which detects that the failure 107 occurs, transmits a MAC address learning table cancellation frame (at a step Si in FIG. 4). When each relay apparatus receives the MAC address learning table cancellation frame, each relay apparatus determines operation in accordance with whether or not the relay apparatus is adjacent to a failure zone (at steps S3 and S4 in FIG. 4).

It will be assumed that the relay apparatus 1 is adjacent to the failure zone at the step S4 in FIG. 4. In this event, the step S4 is followed by a step S5 at which the relay apparatus 1 immediately cancels contents stored in the MAC address learning table 11.

It will be presumed that the relay apparatus 1 is not adjacent to the failure zone at the step S4 in FIG. 4. Under the circumstances, the step S4 is succeeded by a step S6 at which the relay apparatus 1 starts the timer 12 and initializes the counter 16. Thereafter, the relay apparatus 1 transfers the MAC address learning table cancellation frame to other relay apparatuses (at step S7 in FIG. 4). Activated by the MAC address learning table cancellation frame, after a lapse of the predetermined time interval in the timer 12 (at step S8 in FIG. 4), the timer 12 of the relay apparatus 1 cancels the contents stored in the MAC address learning table 11 (at a step S9 in FIG. 4).

Turning to FIG. 5, it will be assumed that the timer 12 does not start (in NO at a step S11 in FIG. 5). In this event, the relay apparatus 1 transfers, to other relay apparatuses, frames where each relay apparatus should transfer to the other relay apparatuses (at a step S18 in FIG. 5).

It will be presumed that the timer 12 starts (in YES at the step S S11 in FIG. 5). Under the circumstances, the relay apparatus 1 carries out the following operation.

It will be assumed that the relay apparatus 1 receives the frame (at a step S12 in FIG. 5). In this event, the port move detecting circuit 15 determines whether or not a port move occurs (at a step S 13 in FIG. 5). When the port move does not occur (NO at the step S13), the step S13 proceeds to the step S 18 at which the relay apparatus 1 transfers the frame to the other relay apparatuses in the usual way.

It will be presumed that the port move occurs (YES at the step S13 in FIG. 5). Under the circumstances, the relay apparatus 1 refers to the occurrence count of the port move recorded in the counter 16. It will be assumed that the occurrence count of the port move is zero (YES at a step S14 in FIG. 5). In this event, the port move detecting circuit 15 of the relay apparatus 1 renews the value or the count (the occurrence count) in the counter 16 so as to increment by one (at a step S15 in FIG. 5), the frame switching circuit 13 of the relay apparatus 1 renews the MAC address learning table 11 (at a step S16 in FIG. 5) and transfers the frame to the other relay apparatuses through the port move detecting circuit 15 (at the step S18 in FIG. 5).

It will be presumed that the occurrence count of the port move is not zero (NO at the step S14 in FIG. 5). Under the circumstances, the frame switching circuit 13 of the relay apparatus 1 deletes the frame (at a step S19 in FIG. 5). Therefore, the frame switching circuit 13 of the relay apparatus 1 does not transfer the frame to the other relay apparatuses.

FIGS. 6 through 9 are sequence charts for use in describing first through fourth operation examples of the network according to the exemplary embodiment of this invention.

Figure 6:
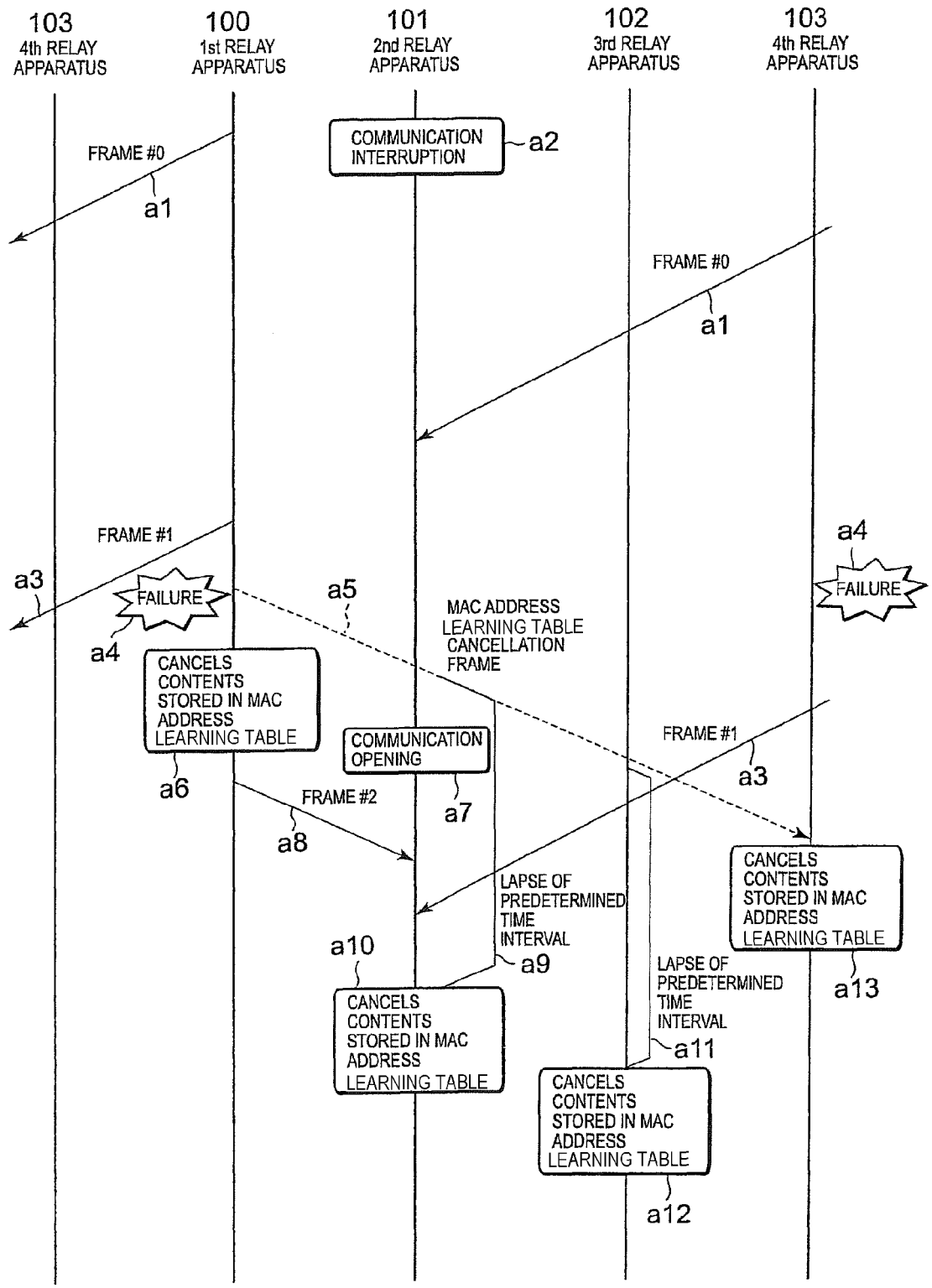
FIG. 6 is a sequence chart for use in describing a first operation example of the network according to the exemplary embodiment of this invention.

Referring to FIGS. 6 thorough 9, these figures show the operation of and advantages of the network according to an exemplary embodiment of the invention.

Referring now FIG. 6, the description will proceed to the first operation example in a case where the failure 107 occurs and an arrival order of a frame reverses when a transfer path or route is recorded or stored in the MAC address learning table 11. Herein, each of the first through the fourth relay apparatuses 100, 101, 102, and 103 is similar in structure to the relay apparatus illustrated in FIG. 1.

A zeroth frame #0 is transferred from the first relay apparatus 100 toward the second relay apparatus 101 in a clockwise direction (at a first event a1 in FIG. 6). Therefore, the MAC address learning table 11 in each relay apparatus is renewed and a path or route passing through the first relay apparatus 100, the fourth relay apparatus 103, the third relay apparatus 102, and the second relay apparatus 101 in the clockwise direction is recorded in the MAC address learning table 11. In addition, a path or route between the first relay apparatus 100 and the second relay apparatus 101 is broken or interrupted by the secondary port 104 of the second relay apparatus 101 in order to release the loop state of the network (at a second event a2 in FIG. 6).

A first frame #1 is transferred from the first relay apparatus 100 toward the second relay apparatus 101 in the clockwise direction (at a third event a3 in FIG. 6).

At a time instant when the first frame #1 is transferred to the fourth relay apparatus 103, the failure 107 occurs between the first relay apparatus 100 and the fourth relay apparatus as shown in FIG. 3 (at a fourth event a4 in FIG. 6).

Communication between the first relay apparatus 100 and the second relay apparatus 101 in a counterclockwise direction that is broken or interrupted (at the second event a2 in FIG. 6) is opened by the secondary port 104 of the second relay apparatus 101 (at a seventh event a7 in FIG. 6).

Inasmuch as the failure 107 occurs, a MAC address learning table cancellation frame is transmitted from the first relay apparatus 100 in the counterclockwise direction (at a fifth event a5 in FIG. 6) and the first and the fourth relay apparatuses 100 and 103, which are adjacent to a failure zone, cancel contents stored in the MAC address learning table 11 upon receipt of the MAC address learning table cancellation frame (at sixth and thirteenth events a6 and a13 in FIG. 6).

A second frame #2 is transmitted from the first relay apparatus 100 toward the second relay apparatus 101 in the counterclockwise direction (at an eighth event a8 in FIG. 6). The second frame #2 is directly transmitted from the first relay apparatus 100 to the second relay apparatus 101. This is because the contents stored in the MAC address learning table 11 are cancelled and a flooding occurs caused by absence of the path or route.

When the second frame #2 arrives in the second relay apparatus 101, the port move occurs because the second frame #2 arrives through a path or route which is different from that through which the zeroth frame #0 arrives. Under the circumstances, the MAC address learning table 11 in the second relay apparatus 101 is renewed by the frame switching circuit 13 using information in the second frame #2 and the counter 16 in the second relay apparatus 101 is counted up by the port move detecting circuit 15.

Thereafter, the first frame #1 arrives in the second relay apparatus 101 in the clockwise direction. However, inasmuch as the port move for the second time occurs, the MAC address learning table 11 in the second relay apparatus 10 is not renewed and the first frame #1 is not transferred.

When the MAC address learning table cancellation frame arrives at the second relay apparatus 101 and the third relay apparatus 102 in the counterclockwise direction, contents stored in the MAC address learning table 11 in the second and the third relay apparatuses 101 and 102 are cancelled (at tenth and twelfth events a1° and a12 in FIG. 6) after a lapse of the predetermined time interval (at ninth and eleventh events a9 and all in FIG. 6).

Figure 7:
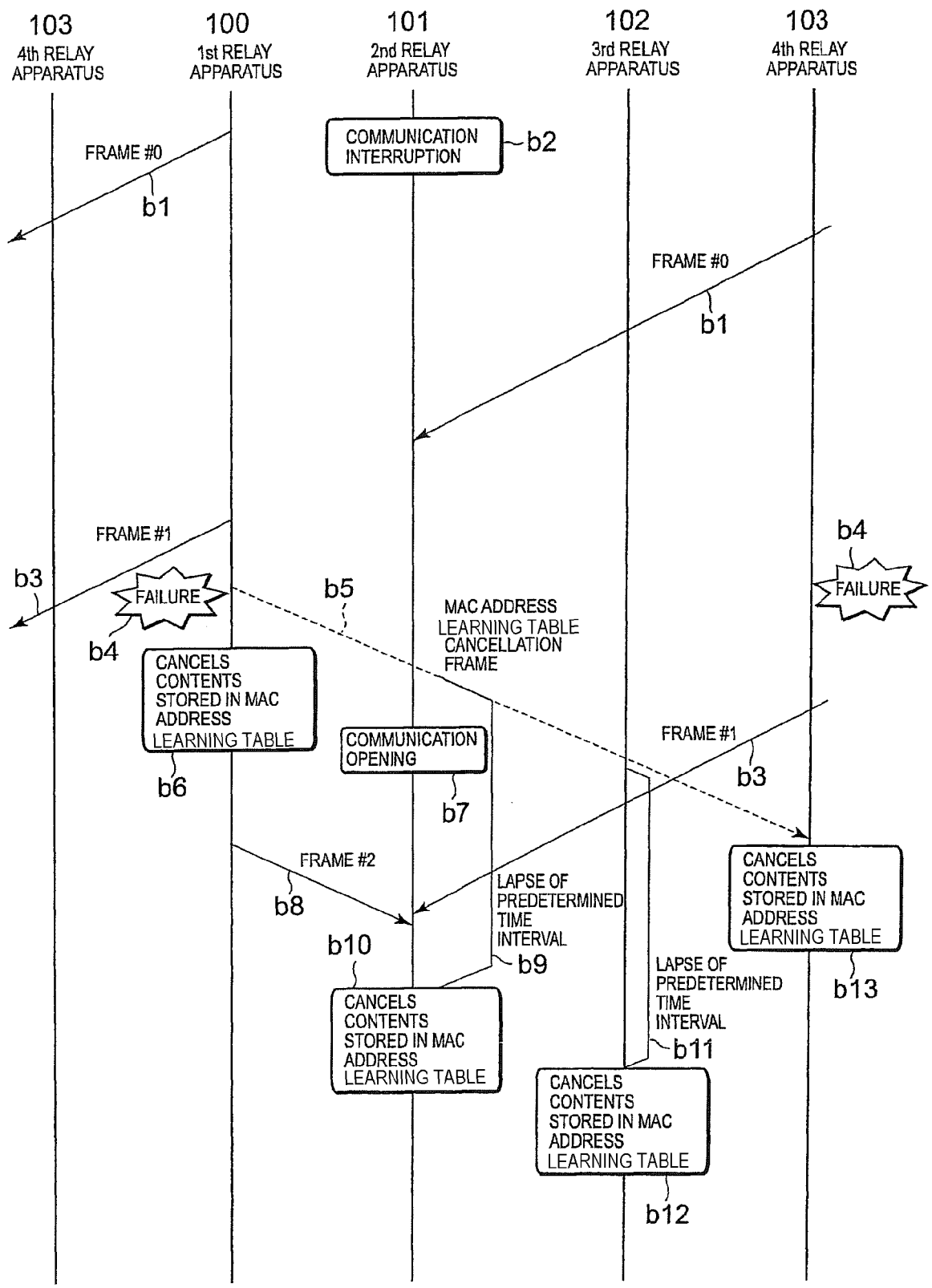
FIG. 7 is a sequence chart for use in describing a second operation example of the network according to the exemplary embodiment of this invention.

Referring now FIG. 7, the description will proceed to the second operation example in a case where the failure 107 occurs and a frame arrives in a transmission order when a transfer path or route is recorded or stored in the MAC address learning table 11.

A zeroth frame #0 is transferred from the first relay apparatus 100 toward the second relay apparatus 101 in a clockwise direction (at a first event b1 in FIG. 7). Therefore, the MAC address learning table 11 in each relay apparatus is renewed by the frame switching circuit 13 and a path or route passing through the first relay apparatus 100, the fourth relay apparatus 103, the third relay apparatus 102, and the second relay apparatus 101 in the clockwise direction is recorded in the MAC address learning table 11. In addition, a path or route between the first relay apparatus 100 and the second relay apparatus 101 is broken or interrupted by the secondary port 104 of the second relay apparatus 101 in order to release the loop state of the network (at a second event b2 in FIG. 7).

A first frame #1 is transferred from the first relay apparatus 100 toward the second relay apparatus 101 in the clockwise direction (at a third event b3 in FIG. 7).

At a time instant when the first frame #1 is transferred to the fourth relay apparatus 103, the failure 107 occurs between the first relay apparatus 100 and the fourth relay apparatus 103 as shown in FIG. 3 (at a fourth event b4 in FIG. 7).

Communication between the first relay apparatus 100 and the second relay apparatus 101 that is broken or interrupted in the counterclockwise direction (at the second event b2 in FIG. 7) is opened by the secondary port of the second relay apparatus 101 (at a seventh event b7 in FIG. 7) because the failure 107 occurs.

Inasmuch as the failure 107 occurs, a MAC address learning table cancellation frame is transmitted from the first relay apparatus 100 in the counterclockwise direction (at a fifth event b5 in FIG. 7) and the first and the fourth relay apparatuses 100 and 103, which are adjacent to a failure zone, cancel contents stored in the MAC address learning table 11 upon receipt of the MAC address learning table cancellation frame (at sixth and thirteenth events b6 and b13 in FIG. 7).

A second frame #2 is transmitted from the first relay apparatus 100 toward the second relay apparatus 101 in the counterclockwise direction (at an eighth event b8 in FIG. 7). The second frame #2 is directly transmitted from the first relay apparatus 100 to the second relay apparatus 101. This is because the contents stored in the MAC address learning table 11 are cancelled and a flooding occurs caused by absenCE of the path or route.

The first frame #1 arrives in the second relay apparatus 101. In this event, a port move does not occur because the first frame #1 arrives in the second relay apparatus 101 through a path or route in the clockwise direction that is similar to that through the zeroth frame #0 arrives.

Thereafter, the second frame #2 arrives in the second relay apparatus 101. In this event, the frame switching circuit 13 of the second relay apparatus 101 carries out renewal of the MAC address learning table 11 in the second relay apparatus 101.

When the MAC address learning table cancellation frame arrives at the second relay apparatus 101 and the third relay apparatus 102, contents stored in the MAC address learning table 11 in the second and the third relay apparatuses 101 and 102 are cancelled (at tenth and twelfth events b10 and b12 in FIG. 7) after a lapse of the predetermined time interval (at ninth and eleventh events b9 and b11 in FIG. 7).

Subsequently referring FIG. 8, the description will proceed to the third operation example in a case where the failure 107 occurs and an arrival order of a frame reverses when a transfer path or route is not recorded or not stored in the MAC address learning table 11.

Figure 8:
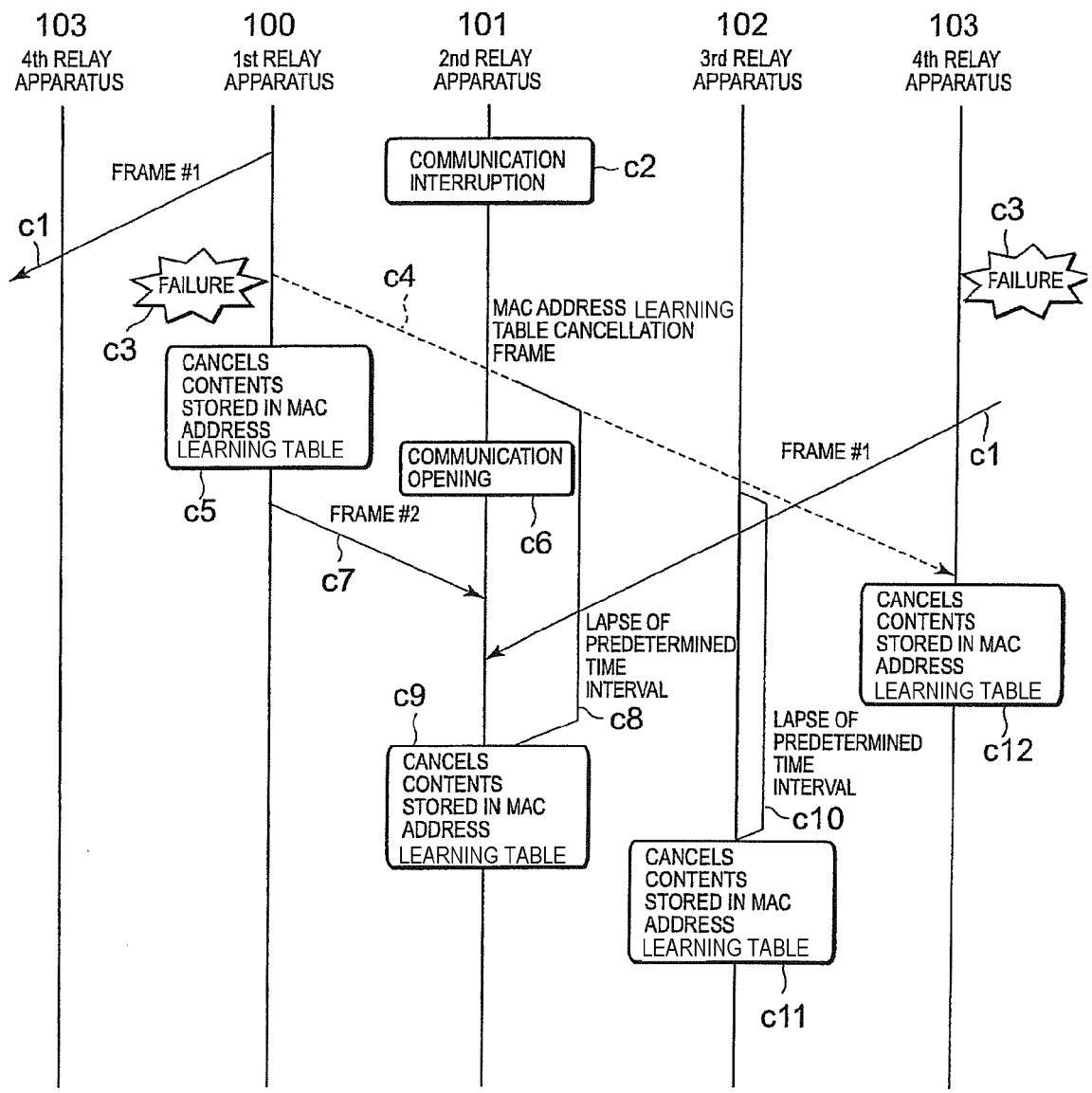
FIG. 8 is a sequence chart for use in describing a third operation example of the network according to the exemplary embodiment of this invention.

A first frame #1 is transferred from the first relay apparatus 100 toward the second relay apparatus 101 in a clockwise direction (at a first event c1 in FIG. 8). In addition, a path or route between the first relay apparatus 100 and the second relay apparatus 101 is broken or interrupted by the secondary port 104 of the second relay apparatus 101 in order to release the loop state of the network (at a second event c2 in FIG. 8).

At a time instant when the first frame #1 is transferred to the fourth relay apparatus 103, the failure 107 occurs between the first relay apparatus 100 and the fourth relay apparatus as shown in FIG. 3 (at a third event c3 in FIG. 8).

Communication between the first relay apparatus 100 and the second relay apparatus 101 in the counterclockwise direction that is broken or interrupted (at the second event c2 in FIG. 8) is opened by the secondary port 104 of the second relay apparatus 101 (at a sixth event c6 in FIG. 8).

Inasmuch as the failure 107 occurs, a MAC address learning table cancellation frame is transmitted from the first relay apparatus 100 in the counterclockwise direction (at a fourth event c4 in FIG. 8) and the first and the fourth relay apparatuses 100 and 103, which are adjacent to a failure zone, cancel contents stored in the MAC address learning table 11 upon receipt of the MAC address learning table cancellation frame (at fifth and twelfth events c5 and c12 in FIG. 8).

A second frame #2 is transmitted from the first relay apparatus 100 toward the second relay apparatus 101 in the counterclockwise direction (at a seventh event c9 in FIG. 8). The second frame #2 is directly transmitted from the first relay apparatus 100 to the second relay apparatus 101. This is because the contents stored in the MAC address learning table 11 are cancelled and a flooding occurs caused by absence of the path or route.

When the second frame #2 arrives in the second relay apparatus 101, the MAC address learning table 11 in the second relay apparatus 101 is renewed by the frame switching circuit 13 using information in the second frame #2 because path or route information is not recorded or not stored in the MAC address learning table 11.

Thereafter, the first frame #1 arrives in the second relay apparatus 101 in the clockwise direction. However, inasmuch as the port move for the second time occurs, the MAC address learning table 11 in the second relay apparatus 10 is not renewed and the first frame #1 is not transferred.

When the MAC address learning table cancellation frame arrives at the second relay apparatus 101 and the third relay apparatus 102, contents stored in the MAC address learning table 11 in the second and the third relay apparatuses 101 and 102 are cancelled by the timer 12 (at ninth and eleventh events c9 and c11 in FIG. 8) after a lapse of the predetermined time interval (at eighth and tenth events c8 and c10 in FIG. 8).

Figure 9:
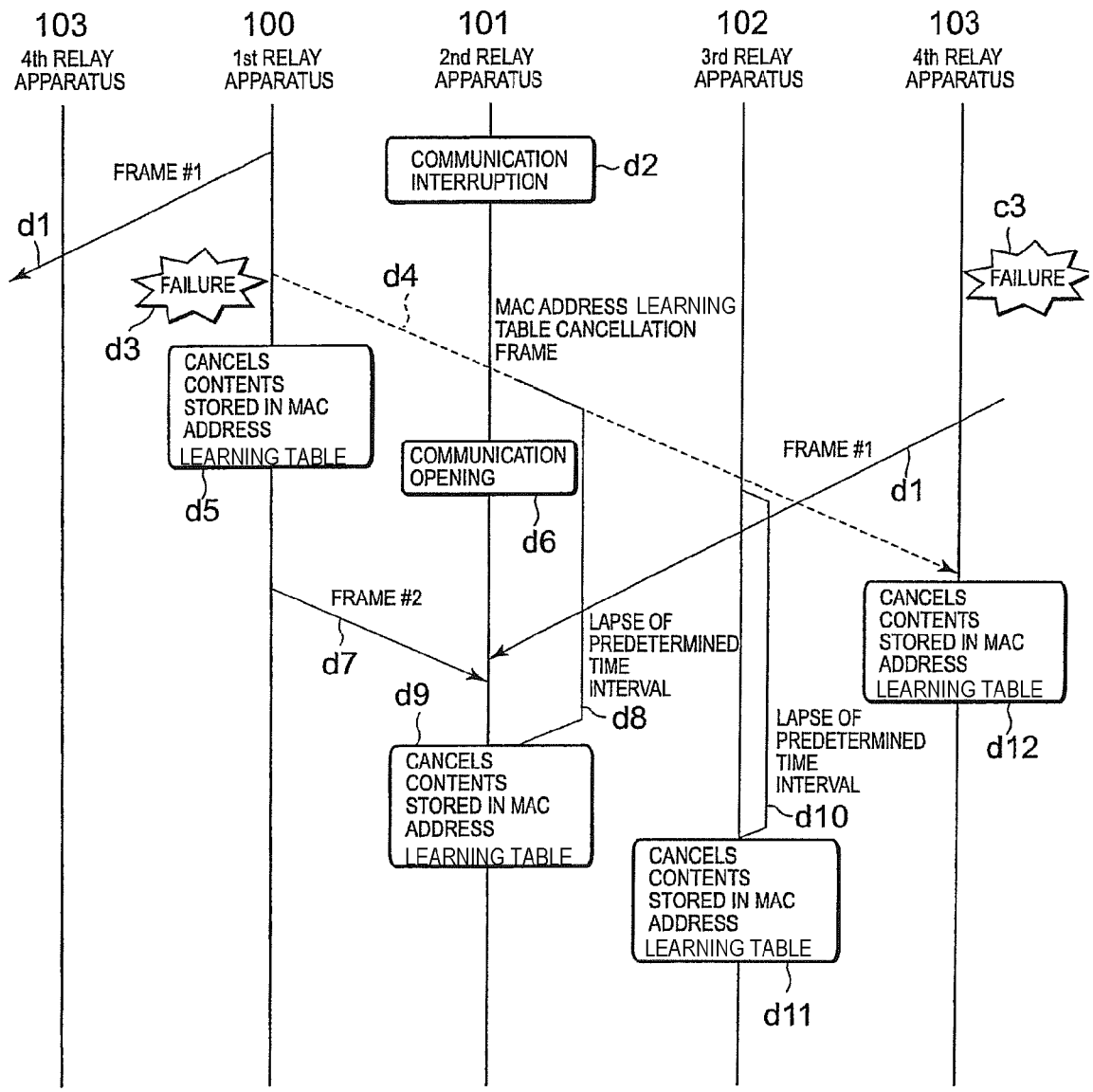
FIG. 9 is a sequence chart for use in describing a fourth operation example of the network according to the exemplary embodiment of this invention.

Furthermore referring now FIG. 9, the description will proceeds to the fourth operation example in a case where the failure 107 occurs and a frame arrives in a transmission order when a transfer or route path is not recorded or not stored in the MAC address learning table 11.

A first frame #1 is transferred from the first relay apparatus 100 toward the second relay apparatus 101 in a clockwise direction (at a first event d1 in FIG. 9). In addition, a path or route between the first relay apparatus 100 and the second relay apparatus 101 is broken or interrupted by the secondary port 104 of the second relay apparatus 101 in order to release the loop state of the network (at a second event d2 in FIG. 9).

At a time instant when the first frame #1 is transferred to the fourth relay apparatus 103, the failure 107 occurs between the first relay apparatus 100 and the fourth relay apparatus 103 as shown in FIG. 3 (at a third event d3 in FIG. 9).

Communication between the first relay apparatus 100 and the second relay apparatus 101 in a counterclockwise direction that is broken or interrupted (at the second event d2 in FIG. 9) is opened by the secondary port 104 of the second relay apparatus 101 (at a sixth event d6 in FIG. 9) because the failure 107 occurs.

Inasmuch as the failure 107 occurs, a MAC address learning table cancellation frame is transmitted from the first relay apparatus 100 in the counterclockwise direction (at a fourth event d4 in FIG. 9) and the first and the fourth relay apparatuses 100 and 103, which are adjacent to a failure zone, cancel contents stored in the MAC address learning table 11 upon receipt of the MAC address learning table cancellation frame (at fifth and twelfth events d5 and d1 2 in FIG. 9).

A second frame #2 is transmitted from the first relay apparatus 100 toward the second relay apparatus 101 in the counterclockwise direction (at a seventh event c7 in FIG. 9). The second frame #2 is directly transmitted from the first relay apparatus 100 to the second relay apparatus 101. This is because the contents stored in the MAC address learning table 11 are cancelled and a flooding occurs caused by absence of the path or route.

When the first frame #1 arrives in the second relay apparatus 101, the MAC address learning table 11 in the second relay apparatus 101 is renewed by the frame switching circuit 13 using information in the first frame #1 because the path or route information is not recorded or not stored in the MAC address learning table 11. In addition, the counter 16 is counted up by the port move detecting circuit 15.

Thereafter, the second frame #2 arrives in the second relay apparatus 101. However, inasmuch as occurrence of the port move is twice, the MAC address learning table 11 is not renewed and the second frame #2 is not transferred.

When the MAC address learning table cancellation frame arrives at the second relay apparatus 101 and the third relay apparatus 102, contents stored in the MAC address learning table 11 in the second and the third relay apparatuses 101 and 102 are cancelled by the timer 12 (at ninth and eleventh events d9 and d11 in FIG. 9) after a lapse of the predetermined time interval (at eighth and tenth events d8 and d10 in FIG. 9). Therefore, in the MAC address learning table 11, mistaken path or route information, which is recorded by using the first frame #1 arrived later, is deleted.

In the manner which is described above, according to the exemplary embodiment of this invention, in the network using the ring redundancy method which is technique for ensuring redundancy with a loop worked around in a case the first through the fourth relay apparatuses 100 to 103 are connected, when a frame arrives through a path or route rather than a learned path or route before and after a path or route switching, the exemplary embodiment comprises detecting it and carrying out a suitable processing. It is therefore possible to prevent reversal of arrival order of frames in a transient state during the path or route switching and communication failure which may occur caused by the reversal of arrival order.

The relay apparatus 1 according to the exemplary embodiment includes the port move detecting circuit 15 for detecting the port move occurring in the case where the frame arrives through a path or route rather than the learned path or route stored in the MAC address learning table 11, the counter 16 for counting a count where the port move is detected by the port move detecting circuit 15, the frame switching circuit 13 for determining processing when the frame is transferred to the relay apparatus 1, the MAC address learning table 11 for recording transfer destinations for the frames, and the timer 12 for measuring a time interval elapsed since the frame switching circuit 13 detects that failure occurs in the ring connection.

The relay apparatus 1 keeps watch on the port move by the port move detecting circuit 15 when the failure 107 is detected. When the port move occurs once, the MAC address learning table 11 is renewed by the frame switching circuit 13. When the port move occurs twice or more, the MAC address learning table 11 is not renewed and the frame for making the port move occur is not transferred. In the manner which is described above, according to the exemplary embodiment, the reversal of arrival order is prevented by doing not transfer the frame.

In addition, the timer 12 of the relay apparatus 1 cancels contents stored in the MAC address learning table 11 when the timer 12 detects that the predetermined time interval elapses since the failure 107 is detected. In the exemplary embodiment, mistaken path or route information is not continuously stored in the MAC address learning table 11 by cancelling the contents stored in the MAC address learning table 11.

Furthermore, in the relay apparatus 1, the timer 12 and the counter 16 do not operate until the failure 107 occurs again after the contents stored in the MAC address learning table 11 are cancelled.

In the relay apparatus of the first exemplary aspect of this invention, the above-mentioned relay apparatus may include a counter for counting a count where the port move is detected by the port move detecting circuit on the path switching on the ring redundancy, and a frame switching circuit for controlling renewal of the MAC address learning table on the basis of the count of the counter. The frame switching circuit may renew the MAC address learning table when the port move occurs once. The frame switching circuit may not renew the MAC address learning table and may inhibit transfer of the frame for making the port move occur when the port move occurs twice or more. The relay apparatus further may include a timer for measuring a time interval since a failure occurs in a ring connection on the path switching on the ring redundancy. In this event, the timer cancels contents stored in the MAC address learning table when the timer detects a lapse of a predetermined time interval.

In the network of the second exemplary aspect of this invention, each of the relay apparatuses may include a counter for counting a count where the port move is detected by the port move detecting circuit on the path switching on the ring redundancy, and a frame switching circuit for controlling renewal of the MAC address learning table on the basis of the count of the counter. The frame switching circuit may renew the MAC address learning table when the port move occurs once. The frame switching circuit may not renew the MAC address learning table and may inhibit transfer of the frame for making the port move occur when the port move occurs twice or more. Each of the relay apparatuses further may include a timer for measuring a time interval since a failure occurs in a ring connection on the path switching on the ring redundancy. In this event, the timer cancels contents stored in the MAC address learning table when the timer detects a lapse of a predetermined time interval.

In the frame relay method of the third exemplary aspect of this invention, the above-mentioned frame relay method may further include, in said relay apparatus, counting a count where the port move is detected on the path switching on the ring redundancy, and controlling renewal of the MAC address learning table on the basis of the count of the counter. The renewal controlling step may renew the MAC address learning table when the port move occurs once. The renewal controlling step may not renew the MAC address learning table and may inhibit transfer of the frame for making the port move occur when the port move occurs twice or more. The frame relay method further may include, in the relay apparatus, measuring a time interval by a timer since a failure occurs in a ring connection on the path switching on the ring redundancy. In this event, the timer cancels contents stored in the MAC address learning table when the timer detects a lapse of a predetermined time interval.

While this invention has been particularly shown and described with reference to exemplary embodiments thereof, the invention is not limited to these embodiments. It will be understood by those of ordinary skill in the art that various changes in form and details may be used therein without departing from the sprit and scope of the present invention as defined by the claims.

What is claimed is:

1. A relay apparatus comprising:
   a media access control (MAC) address learning table to record transfer destinations of frames, the relay apparatus to be connected to a plurality of other relay apparatuses within a network in a ring redundancy configuration;
   a timer that is started in response to a failure within the network; and,
   a port moving detection circuit to detect a port move occurring when a frame arrives on a path other than a path within the MAC address learning table, due to a path change within the ring redundancy configuration,
   wherein the port moving detection circuit is to detect the port move only after the timer has been started in response to the failure within the network,
   wherein in response to starting of the timer, a MAC address learning table cancellation frame is transferred from the relay apparatus,
   and wherein the interaction of the MAC address learning table, the timer, and the port move detection circuit prevent a reversal of arrival order of frames, and prevent incorrect learning of the MAC address learning table.

2. The relay apparatus of claim 1, wherein the relay apparatus further comprises:
   a counter to count a number of times the port move is detected by the port moving detection circuit; and,
   a frame switching circuit to control renewal of the MAC address learning table based on the number of times counted by the counter.

3. The relay apparatus of claim 2, wherein the frame switching circuit is to renew the MAC address learning table when the number of times counted by the counter is equal to one,
   and wherein the frame switching circuit is not to renew the MAC address learning table and is to prevent transfer of the frame when the number of times counted by the counter is greater than one.

4. A system comprising:
   a network; and,
   a plurality of relay apparatuses connected to one another within the network in a ring redundancy configuration,
   wherein each relay apparatus comprises:
      a media access control (MAC) address learning table to record transfer destinations of frames;
      a timer that is started in response to a failure within the network; and,
      a port moving detection circuit to detect a port move occurring when a frame arrives on a path other than a path within the MAC address learning table, due to a path change within the ring redundancy configuration,
   wherein the port moving detection circuit is to detect the port move only after the timer has been started in response to the failure within the network,
   wherein in response to starting of the timer, a MAC address learning table cancellation frame is transferred from the relay apparatus,
   and wherein the interaction of the MAC address learning table, the timer, and the port move detection circuit prevent a reversal of arrival order of frames, and prevent incorrect learning of the MAC address learning table.

5. The system of claim 4, wherein each relay apparatus further comprises:
    a counter to count a number of times the port move is detected by the port moving detection circuit; and,
    a frame switching circuit to control renewal of the MAC address learning table based on the number of times counted by the counter.

6. The system of claim 5, wherein the frame switching circuit is to renew the MAC address learning table when the number of times counted by the counter is equal to one,
    and wherein the frame switching circuit is not to renew the MAC address learning table and is to prevent transfer of the frame when the number of times counted by the counter is greater than one.

7. A method comprising:
    in response to a failure within a network of a plurality of relay apparatuses having a ring redundancy configuration,
        starting a timer in a given relay apparatus of the plurality of relay apparatuses;
        only after the timer has been started,
            detecting at a port moving detection circuit in the given relay apparatus a port move occurring when a frame arrives at the given relay apparatus on a path other than a path within a media access control (MAC) address learning table of the given relay apparatus, due to a path change within the ring redundancy configuration;
        in response to starting of the timer,
            transferring a MAC address learning table cancellation frame from the given relay apparatus,
    wherein the interaction of the MAC address learning table, the timer, and the port move detection circuit prevent a reversal of arrival order of frames, and prevent incorrect learning of the MAC address learning table.

8. The method of claim 7, further comprising:
    counting, in a counter, a number of times the port move is detected by the port moving detection circuit;
    controlling renewal of the MAC address learning table based on the number of times counted by the counter.

9. The method of claim 8, wherein controlling the renewal of the MAC address learning table based on the number of times counted by the counter comprises:
    where the number of times counted by the counter is equal to one, renewing the MAC address learning table; and,
    where the number of times counted by the counter is greater than one, not renewing the MAC address learning table, and preventing transfer of the frame.

* * * * *